United States Patent
Winkel et al.

(10) Patent No.: US 10,604,352 B2
(45) Date of Patent: Mar. 31, 2020

(54) METHOD AND APPARATUS FOR MONITORING THE OPERATIONAL BEHAVIOR, STATE AND/OR LOADING OF BELT CONVEYORS DURING THE OPERATION THEREOF

(71) Applicant: indurad GmbH, Aachen (DE)

(72) Inventors: Reik Winkel, Aachen (DE); Matthias Rabel, Ulm (DE)

(73) Assignee: indurad GmbH, Aachen (DE)

( * ) Notice: Subject to any disclaimer, the term of this patent is extended or adjusted under 35 U.S.C. 154(b) by 0 days.

(21) Appl. No.: 16/061,754

(22) PCT Filed: Dec. 14, 2015

(86) PCT No.: PCT/EP2015/079611
§ 371 (c)(1),
(2) Date: Jun. 13, 2018

(87) PCT Pub. No.: WO2017/101969
PCT Pub. Date: Jun. 22, 2017

(65) Prior Publication Data
US 2018/0362262 A1 Dec. 20, 2018

(51) Int. Cl.
*B65G 43/08* (2006.01)
*B65G 17/02* (2006.01)

(52) U.S. Cl.
CPC ............ *B65G 43/08* (2013.01); *B65G 17/02* (2013.01); *B65G 2203/0233* (2013.01); *B65G 2203/042* (2013.01)

(58) Field of Classification Search
CPC ................................ B65G 43/08; B65G 17/02
(Continued)

(56) References Cited

U.S. PATENT DOCUMENTS 6,032,787 A * 3/2000 Kellis .................... B65G 43/02
198/502.1
6,831,566 B1 * 12/2004 Kusel .................... B65G 43/02
198/464.4
(Continued)

FOREIGN PATENT DOCUMENTS

CN 204124749 U 1/2015
DE 4240094 A1 6/1994
(Continued)

OTHER PUBLICATIONS

Parr A. et al: "Inverse SAR approach for localization of moving RFID tags" RFID (RFID), 2013 IEEE International Conference on, IEEE, dated Apr. 30, 2013, pp. 104-109.

*Primary Examiner* — William R Harp
(74) *Attorney, Agent, or Firm* — Dinsmore & Shohl LLP

(57) ABSTRACT

The present invention relates to a method by means of which conveyor belts of belt conveyors, which can be loaded with a bulk material, have their operational behaviour and/or state and/or loading monitored during operation, wherein the belt conveyor has provided on it at least one radar-antenna combination, which consists of at least one transmitting antenna and one receiving antenna and is oriented onto the conveyor belt, wherein a radar-antenna combination arranged to the side of the conveyor belt periodically picks up the reflection from emitted radar beams by way of the side edge of the conveyor belt and/or the loading boundary of a bulk material located on the conveyor belt and communicates corresponding signals to a signal-processing unit, whereas a radar-antenna combination oriented onto the surface of the conveyor belt periodically picks up the reflection of emitted radar beams, on the one hand, by way of the surface of the conveyor belt and, on the other hand, by way of reinforcing supports embedded in the conveyor
(Continued)

belt and communicates corresponding signals to a signal-processing unit.

18 Claims, 2 Drawing Sheets

(58) Field of Classification Search
USPC .................................................. 198/341.07
See application file for complete search history.

(56) References Cited

U.S. PATENT DOCUMENTS

| | | | |
|---|---|---|---|
| 7,427,767 B2* | 9/2008 | Kemp ..................... | B65G 43/02 |
| | | | 198/502.1 |
| 8,618,929 B2* | 12/2013 | Ganapathy ............. | B65G 43/02 |
| | | | 340/539.1 |
| 9,988,217 B2* | 6/2018 | Hou ........................ | B65G 43/02 |
| 2012/0286948 A1 | 11/2012 | Ganapathy et al. | |
| 2017/0167865 A1* | 6/2017 | Welle ..................... | G01B 21/20 |

FOREIGN PATENT DOCUMENTS

| | | |
|---|---|---|
| DE | 10048552 A1 | 5/2001 |
| DE | 102007044913 A1 | 4/2008 |

* cited by examiner

METHOD AND APPARATUS FOR MONITORING THE OPERATIONAL BEHAVIOR, STATE AND/OR LOADING OF BELT CONVEYORS DURING THE OPERATION THEREOF

CROSS-REFERENCE TO RELATED APPLICATION

This application is the U.S. national stage PCT/EP2015/079611, filed Dec. 14, 2015, which is hereby incorporated by reference in its entirety.

FIELD OF INVENTION

The invention relates to a method of monitoring the running behavior and/or the state and/or the loading of conveyor belts loadable with a bulk material in belt conveyors. Such a monitoring deals, on the one hand, with ensuring a straight-line progression of the conveyor belt and the knowledge of the location of the bulk material on the conveyor belt and, on the other hand, with the monitoring of the state of the conveyor belt which changes due to the wear of the conveyor belt that necessarily occurs over the operating period, for example by the occurrence of longitudinal tears, transverse tears, or lateral marginal tears in the belt. Furthermore, a knowledge of the particle size distribution in a bulk material forming the load of the conveyor belt is optionally also desirable.

BACKGROUND OF THE INVENTION

As part of such a monitoring, a monitoring device is first described in DE A 42 40 094, wherein both the respective instantaneous progression of the conveyor belt with respect to the carrier frameworks of the belt conveyor and the exact location of the bulk material on the conveyor belt should be determined. A recognition in good time of a misalignment of the conveyor should thus be detectable, on the one hand, to avoid damage to the conveyor belt and, on the other hand, a uniform loading of the conveyor belt should be ensured, by a filling chute for example, in order, for example, to prevent wear of the conveyor belt due to uneven loading and/or to prevent contamination of the belt conveyor due to falling bulk material. The known device comprises a light source that projects a strip of light onto the material flow, with an additional camera detecting an upper edge extent of both the conveyor belt and of the bulk material disposed thereon imaged hereby and with an associated image evaluation unit subsequently analyzing the upper edge extent. In this respect, the image signals recorded by the camera are digitized so that each picture element can be associated with a gray shade or with a color shade. Two sequential images are respectively subtracted, with bounding picture elements in a differential imaged detected in this manner such as side edges of the conveyor belt or load boundaries of the bulk material support being bundled to form lines of the width of a picture element. The most probably boundary lines are determined as marginal lines of the conveyor belt and of the bulk material disposed thereon and are used for determining the distance of the side edges of the conveyor belt from the carrier framework and for determining the distances between the belt edges and the bulk material edges.

The disadvantage is associated with the known device that the device has a very complex design and is additionally extremely prone to disturbance. In addition, there is the fact that the upper edge extent of the load can in particular only be determined insufficiently with heterogeneous bulk material having small, medium-size, or very large bulk material pieces. The accuracy of the image detection is additionally dependent on the respective environmental conditions such as dust content or moisture content in the environmental air and to this extent the analysis by means of the image evaluation unit suffers from large error sources.

A method is furthermore described with respect to wear monitoring in DE 100 48 552 A1 in which an optoelectronic system having a camera that should optically detect damage to the surface of the conveyor belt is installed in a region in which no bulk material support can be registered, preferably in the region of a bend pulley of the belt conveyor. For the simultaneous localization of damage found, a radar antenna combination is likewise preferably arranged in the region of the bend pulley; it is oriented on the surface of the conveyor belt and detects metal particles vulcanized at intervals in the longitudinal and/or transverse directions in addition to the reinforcement materials vulcanized in the conveyor belt.

The disadvantage is in turn associated with this prior art that the actual wear monitoring takes place by means of a camera whose recording accuracy, in particular in dependence on the external operating conditions, is not sufficient. The radar technology in this connection only serves as an aid for localizing damage to the conveyor belt recorded by the camera.

SUMMARY OF THE INVENTION

It is therefore the underlying object of the invention to provide an improved method serving the monitoring of said aspects in belt conveyors whose accuracy is largely independent of the prevailing environmental conditions and which works with robust, proven components.

This object is achieved including advantageous embodiments and further developments of the invention from the content of the claims that follow this description.

The invention provides a method for this purpose of monitoring unloaded conveyor belts or conveyor belts loaded with a bulk material in belt conveyors in which at least one radar antenna combination is provided at the belt conveyor and comprises at least one transmission antenna and one reception antenna and is oriented on the conveyor belt, wherein at least one radar antenna combination is arranged laterally of the conveyor belt and its aperture angle is oriented obliquely from above on the associated side edge of the conveyor belt and onto at least some of the surface of the conveyor belt adjoining it, and/or wherein at least one radar antenna combination is arranged at a distance from the conveyor belt and its aperture angle is oriented perpendicular to the surface of the conveyor belt, and wherein the radar antenna combination arranged laterally of the conveyor belt periodically receives the reflection of transmitted radar beams by the side edge of the conveyor belt and/or by the load boundary of a bulk material disposed on the conveyor belt and transmits corresponding signals to a signal processing unit, while the radar antenna combination oriented on the surface of the conveyor belt periodically receives the reflection of transmitted radar beams by the surface of the conveyor belt, on the one hand, and by reinforcement materials embedded in the conveyor belt, on the other hand, and transmits corresponding signals to a signal processing unit. An analog to digital conversion of the received signals as well as a mathematical signal processing and an application-related data preparation with respect to the received signals take place in the signal processing unit; at the same time, the signal processing unit serves as an interface to an operator of the belt conveyor or of a corresponding process control.

The advantage is associated with the invention that the radar technology used equally for the different monitoring aspects itself directly generates the monitoring data. The radar technology here delivers reliable measurement values on the basis of the focused beam region and also works with very robust components that ensure a reliable function of the radar technology with a sufficient accuracy under the often rough operating conditions. To this extent, the inclusion of further monitoring devices such as cameras, etc. is not necessary.

Provision is made in accordance with an embodiment of the invention that the radar antenna combination comprises a radar antenna having a transmission function and a reception function.

To the extent that, in accordance with an alternative embodiment of the invention, the radar antenna combination can comprise separate transmission and reception antennas, with generally initially only one transmission antenna and one reception antenna being sufficient, provision can be made in accordance with an embodiment of the invention that a radar antenna combination comprises at least one transmission antenna and a plurality of reception antennas. The radar antenna combination oriented on the surface of the conveyor belt could thus, for example, comprise one transmission antenna and a plurality of reception antennas arranged distributed over the width of the conveyor belt. Provision cold alternatively be made that a radar antenna combination comprises a plurality of transmission antennas and a plurality of reception antennas. For example, two outwardly disposed transmission antennas and therebetween an expedient number of reception antennas could be arranged with respect to the width of the conveyor belt to be monitored. The invention is, however, not restricted to these embodiments, but rather comprises any desired arrangement and association of transmission and reception antennas.

Provision can be made in accordance with an embodiment of the invention that a coherent frequency-modulated signal source such as corresponds to the known principle of a frequency modulated continuous wave radar (FMCW radar) is used for generating the signals fed into the radar antenna combination. Every measurement then takes place starting from the same starting state so that the sampling times in the received signal always take place along the traversing FMCW ramp at the same time after the ramp start. Individual measurements can thus be put into relation with one another with a high precision so that it can generally be stated that a high measurement accuracy is achieved with the aid of the phase indicator.

Provision can furthermore be made that the ultra broadband radar technology is used to generate the signals. The use of radar technology makes possible the detection of the location of the lateral rubber edge of the belt, of the reinforcement materials vulcanized in the belt, and of the surface of the bulk material disposed on the belt in the form of peaks. The accuracy of the separation of the detected peaks with respect to the determination of the running behavior and/or of the belt status and/or of the load is dependent on the bandwidth of the radar signal used. To this extent, a bandwidth that is as large as possible is to be aimed for of more than 5 GHz, preferably of more than 10 GHz.

It is advantageous for the performance of the invention in accordance with an embodiment of the invention if the inverse synthetic aperture radar (ISAR) principle is used to achieve a high resolution, in which principle with a fixed position radar the movement of the conveyor belt in its direction of running is included as a third dimension in the evaluation of the signals in the signal processing unit. The illuminated zones of the antenna lobes should at least overlap a little here at least on a use of separate transmission and reception antennas. Measurements are assembled digitally in equidistant steps to obtain a subpixel resolution. Measurements result here that are very close to one another with a high sampling rate and that are each only a few millimeters apart. On this basis, the surface of the conveyor belt, optionally including its load, can be mapped with even more considerable precision over the total length of the conveyor belt due to the representation of the phase progressions of the complex received spectrum.

Provision can be made in accordance with an embodiment of the invention with respect to the monitoring of a misalignment of the conveyor belt or of a proper loading of the conveyor belt that the distance between the radar antenna combination arranged laterally of the conveyor belt and the side edge of the conveyor belt and/or the load boundary is determined in the signal processing unit and is compared with a desired value respectively stored in the signal processing unit.

Provision can be made in accordance with a further development of the invention that radar antenna combinations are arranged at both sides of the conveyor belt oriented obliquely from above thereon and periodically detect signals and transmit them to the signal processing unit.

The accuracy of the location monitoring of the side edge of the conveyor belt and/or of the load boundary is advantageously more accurate than 5 mm, preferably more accurate than 1 mm.

Provision is made with respect to the wear monitoring by means of the radar technology used in accordance with the invention that the distance between the radar antenna combination oriented on the surface of the conveyor belt and the surface of the conveyor belt as well as the distance between the radar antenna combination and the reinforcement material vulcanized in the conveyor belt are determined in the signal processing unit and the measure of the wear occurring at the surface of the conveyor belt due to the disposed bulk material is determined from the observation of the respective difference between the distances determined.

In accordance with the invention, the detection of the signals can take place at a sampling rate of more than 50 Hz.

Provision can furthermore be made in accordance with an embodiment of the invention that a granulometry of the bulk material is carried out in the signal processing unit on the basis of the signals reflected by the bulk material particles disposed on the conveyor belt.

Provision can be made with respect to an apparatus for carrying out the misalignment monitoring or load monitoring by means of radar technology that the radar antenna combination is fixed by means of a holding device to be attached to a carrier framework of the belt conveyor, with the holding device being adapted for a vertical adjustment and for an angular alignment of the radar antenna combination adjustable with respect to the vertical.

A corresponding apparatus can be configured with respect to the carrying out of a wear monitoring and also of a monitoring of the composition of the load such that the radar antenna combination or a plurality of radar antenna combinations arranged next to one another and covering the width of the conveyor belt is/are installed in the region of a drive pulley or bend pulley for the conveyor belt.

Provision can alternatively be made that the radar antenna combination or a unit of a plurality of radar antenna combinations is periodically travelable over the width of the conveyor belt.

BRIEF DESCRIPTION OF THE DRAWINGS

Embodiments of the invention are shown in the drawing and will be described in the following. There are shown.

DETAILED DESCRIPTION OF THE PREFERRED EMBODIMENTS

Figure 1:
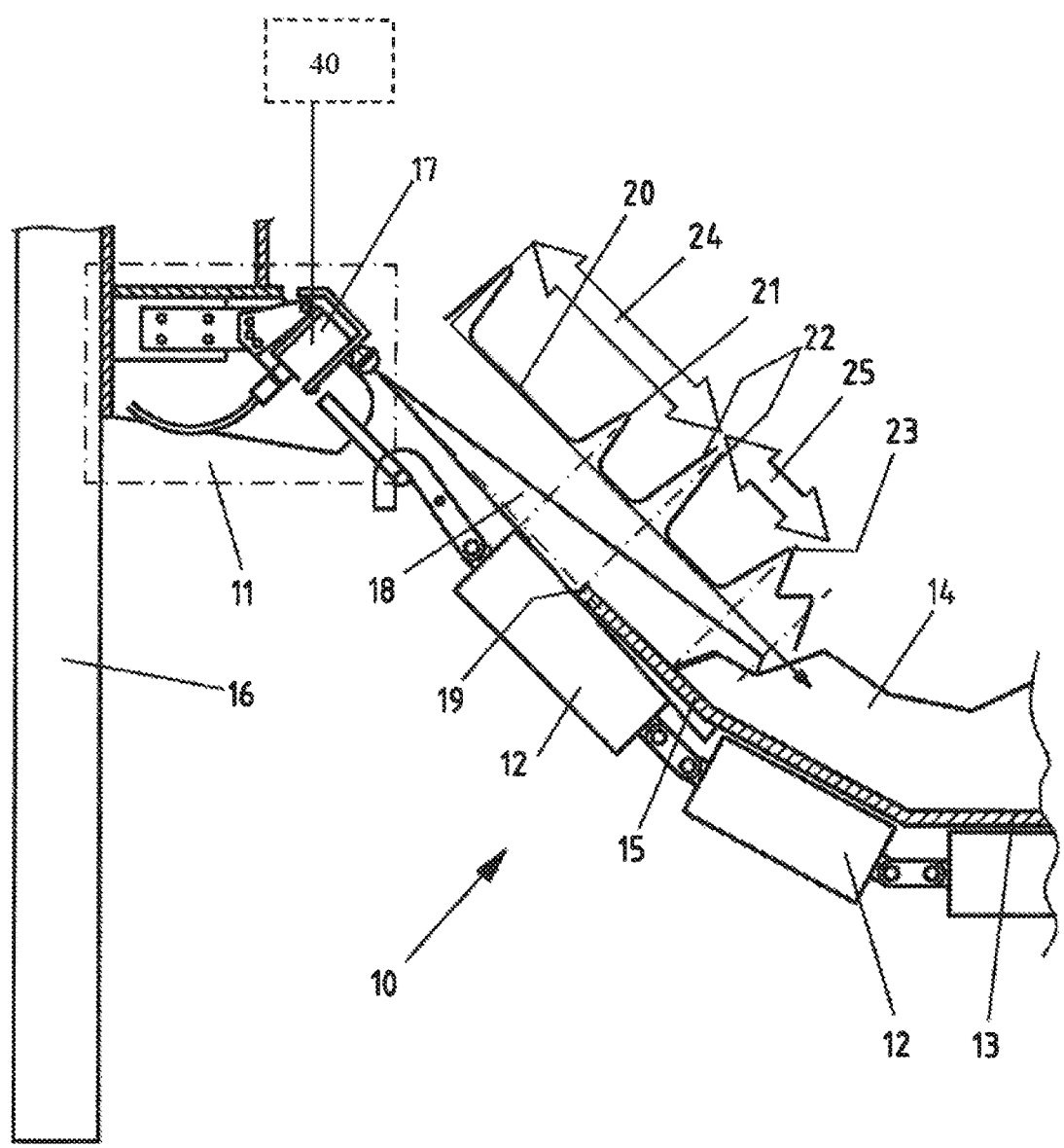
FIG. 1: the lateral region of a conveyor belt with an associated radar antenna combination in a direction of view corresponding to the longitudinal direction of the conveyor belt.

The representation of a belt conveyor 10 only partially visible from FIG. 1 shows that part of a carrier framework 11 at which a garland of individual carrier rollers 12 is suspended on which a conveyor belt 13 is supported. The conveyor belt 13 is loaded with a bulk material 14, with the lateral loading boundary 15 of the bulk material 14 not reaching up to the outer side edge 19 of the conveyor belt, but rather observing a distance therefrom.

A radar antenna combination 17 is held at a holding device 16 attached to the carrier framework 11 of the belt conveyor 10, said radar antenna combination comprising at least one transmission antenna and one reception antenna and its aperture angle 18 of the radar beams being oriented on the side edge 19 of the conveyor belt 13 such that the aperture angle 18 of the radar antenna combinations 17 looking obliquely from above onto the conveyor belt 13 detects the associated side edge 19 of the conveyor belt 13 and at least some of the adjoining surface of the conveyor belt 13 with a part region of the bulk material 14 disposed thereon and of the associated load boundary 15. The kind of distance determination can be recognized by means of an associated reflection curve 20 reproducing the different signal intensity of the reflection of the radar beams transmitted by the radar antenna combination 17. A first peak 21 of the reflection curve 20 thus shows the incidence of the radar beams on the side edge of the outermost carrier roller 12, with this first peak 21 not being considered in the evaluation of the reflection signals. The second peak 22 shows the location of the associated side edge 19 of the conveyor belt 13, from which the distance 24 between the radar antenna combination 17 and the side edge 19 of the conveyor belt 13 can be determined. The third peak 23 shows the location of the load boundary 15 of the bulk material 14 disposed on the conveyor belt 13 so that the distance 25 between the side edge 19 of the conveyor belt 13 and the load boundary 15 can be determined from the distance between the radar antenna combination 17 and the third peak 23 or from the distance between the second peak 22 and the third peak 23. To the extent that even further reflection peaks result from the load cross-section of the bulk material 14 disposed on the conveyor belt 13, they initially do not have to be taken into further consideration. However, with a larger load cross-section, these reflection peaks can also still be used to determine how large the load of the conveyor belt 13 with bulk material 14 is implemented.

Figure 2:
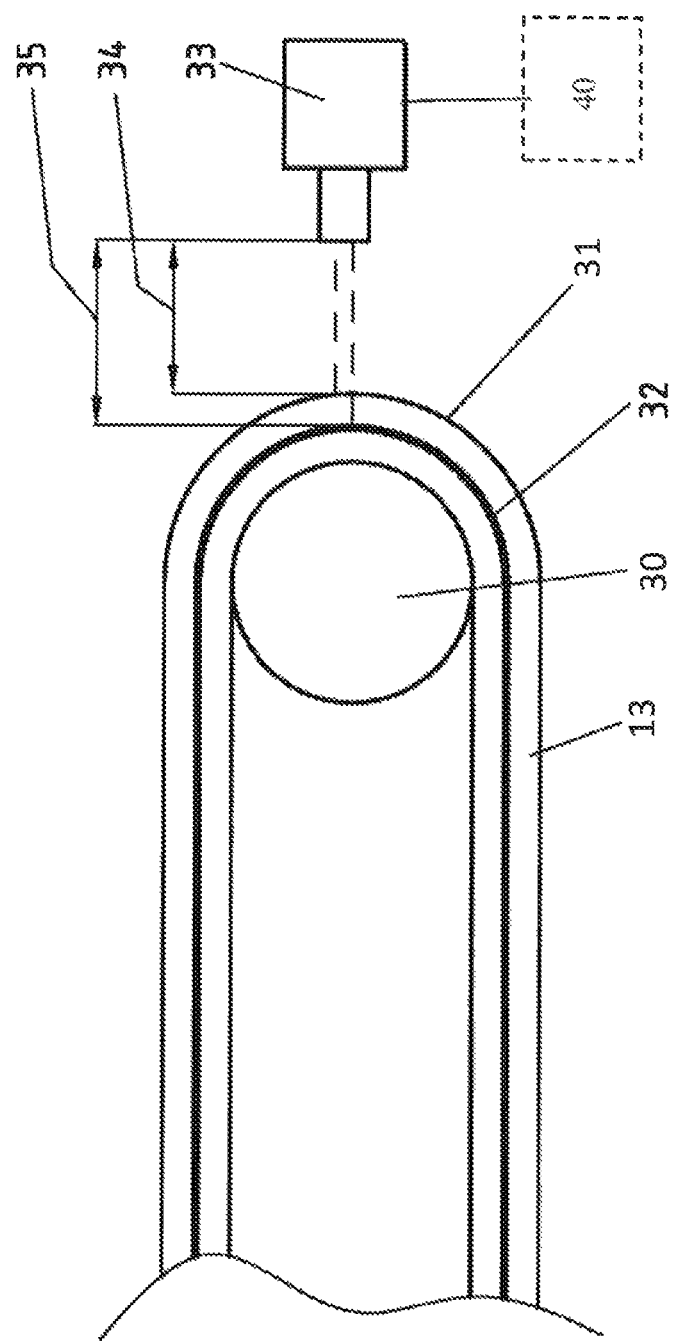
FIG. 2: a side view of the conveyor belt in the region of a bend pulley with a radar antenna combination arranged here in a schematic representation.

To the extent that the detection of signals for a wear monitoring is shown schematically in FIG. 2, a radar antenna combination 33 oriented perpendicular to the surface 31 of the conveyor belt 13 guided over a bend pulley 30 is arranged in the region of the bend pulley 30, The radar beams transmitted by the radar antenna combination 33 are, on the one hand, reflected by the surface 31 of the conveyor belt 13 so that a distance 34 between the surface of the conveyor belt 13 and the radar antenna combination 33 can be determined. At the same time, the transmitted radar beams also penetrate into the material of the conveyor belt 13 and are here reflected by the reinforcement materials 32 vulcanized over the width of the conveyor belt 13 so that a distance between the reinforcement materials 32 and the radar antenna combination 33 can also be determined. The material thickness of the material present above the reinforcement materials 32 up to the surface 31 supporting a bulk material can be determined from the difference of these two distances 34 and 35. The radar antenna combination 17 and the radar antenna combination 33 transmit signals to a signal processing unit 40. To the extent that changes in the distance difference are determined as part of a continuous or intermittently carried out monitoring of this corresponding distance difference, these changes allow a conclusion on wear of the conveyor belt 13 that may be progressing.

The features of the subject matter of these documents disclosed in the above description, in the claims, in the abstract, and in the drawing can be material, individually and also in any desired combination with one another, to the implementation of the invention in its various embodiments.

The invention claimed is:

1. A method of monitoring the running behavior, the state and/or the load of a conveyor belt during operation of a belt conveyor loadable with a bulk material, the conveyor belt having a side edge and a loading boundary defined by an edge of the bulk material loaded on the conveyor belt, the conveyor belt having a distance between the side edge and the loading boundary, the conveyor belt formed of a surface and a layer of reinforcement materials, the conveyor belt having a thickness between the surface and the layer of reinforcement materials, the steps of the method comprising:

providing at least one lateral radar antenna at the belt conveyor, the at least one lateral radar antenna having an aperture angle and comprising at least one transmission antenna and one reception antenna;

arranging the at least one lateral radar antenna laterally on the conveyor belt and orienting the aperture angle of the at least one lateral radar antenna obliquely from above the side edge of the conveyor belt at least towards the side edge of the conveyor belt and the loading boundary of the bulk material;

providing at least one perpendicular radar antenna and arranging the at least one perpendicular radar antenna at another distance from the conveyor belt, the at least one perpendicular radar antenna having another aperture angle that is oriented substantially perpendicular towards the surface of the conveyor belt;

providing a signal processing unit, the at least one lateral radar antenna transmitting frequency modulated continuous wave (FMCW radar) radar beams toward the conveyor belt and periodically receiving a reflection of the transmitted radar beams by the side edge of the conveyor belt and by the loading boundary of the bulk material loaded on the conveyor belt, the at least one lateral radar antenna transmitting corresponding signals to the signal processing unit, providing a reflection curve based on the reflection of the transmitted radar beams, the reflection curve having a first peak showing the radar beams reflected from a side edge of an outermost carrier roller of the belt conveyor, a second peak showing a location of the side edge of the conveyor belt and a third peak showing a location of the loading boundary of the bulk material loaded on the conveyor belt; and orienting the at least one perpendicular radar antenna onto the surface of the conveyor belt, the at least one perpendicular radar antenna transmitting frequency modulated continuous wave (FMCW radar) radar beams and periodically receiving a reflection of the transmitted radar beams by the surface of the conveyor belt and by the layer of reinforcement materials embedded in the conveyor belt, and the at least one perpendicular radar antenna transmitting corresponding signals to the signal processing unit.

2. The method in accordance with claim 1, in which the at least one lateral antenna and/or the at least one perpendicular radar antenna comprises a radar antenna with a transmission function and a reception function.

3. The method in accordance with claim 1, in which the at least one lateral antenna and/or the at least one perpendicular radar antenna comprises at least one transmission antenna and a plurality of reception antennas.

4. The method in accordance with claim 1, in which the at least one lateral antenna and/or the at least one perpendicular radar antenna comprises a plurality of transmission antennas and a plurality of reception antennas.

5. The method in accordance with claim 1, in which a coherent frequency modulated signal source is used to generate a signal fed into the at least one lateral antenna and/or the at least one perpendicular radar antenna.

6. The method in accordance with claim 5, in which ultra broadband radar technology is used to generate the signal.

7. The method in accordance with claim 1, in which an inverse synthetic aperture radar (ISAR) principle is used to achieve a high resolution.

8. The method in accordance with claim 1, in which a distance between the at least one lateral antenna arranged laterally at the conveyor belt and the side edge of the conveyor belt and of the load boundary is determined in the signal processing unit and the distance is compared with a desired value respectively stored in the signal processing unit.

9. The method in accordance with claim 1, in which the at least one lateral antenna is oriented at a right angle to a longitudinal axis of the conveyor belt.

10. The method in accordance with claim 1, in which the at least one lateral antenna oriented obliquely from above on the conveyor belt is arranged on both sides of the conveyor belt, the at least one lateral antenna arranged on the both sides periodically detects the reflection of the transmitted radar beams as signals and transmits the signals to the signal processing unit.

11. The method in, accordance with claim 10, in which the detection oft signals takes place with a sampling rate of more than 50 Hz.

12. The method in accordance with claim 1, in which the belt conveyor having a first distance between the surface of the conveyor belt and the at least one perpendicular radar antenna, a second distance between the layer of reinforcement materials vulcanized in the conveyor belt and the at least one perpendicular radar antenna, and a wear occurring at the surface of the conveyor belt due to the disposed bulk material is determined from an observation of a difference between the first distance and the second distance.

13. The method in accordance with claim 1, in which an accuracy of the location monitoring of the side edge of the conveyor belt and/or of the loading boundary is at least 5 mm.

14. The method in accordance with claim 1, in which an accuracy of the location monitoring of the side edge of the conveyor belt and/or of the loading boundary is at least 1 mm.

15. The method in accordance with claim 1, in which a granulometry of the bulk material is carried out on the basis of the signals reflected by the bulk material particles disposed on the conveyor belt.

16. The method in accordance with claim 1, wherein the step of providing the at least one perpendicular radar antenna comprises arranging a plurality of the at least one perpendicular radar antennas next to one another to cover a width of the conveyor belt and installing the plurality of the at least one perpendicular radar antennas in the region of a drive pulley or bend pulley of the conveyor belt.

17. The method in accordance with claim 16, in which the plurality of the at least one perpendicular radar antennas are periodically travelable over the width of the conveyor belt.

18. An apparatus for monitoring the running behavior, the state and/or the load of a conveyor belt during operation of a belt conveyor loadable with a bulk material, the conveyor belt having a side edge and a loading boundary defined by an edge of the bulk material loaded on the conveyor belt, the conveyor belt having a distance between the side edge and the loading boundary, the conveyor belt formed of a surface and a layer of reinforcement materials, the conveyor belt having a thickness between the surface and surface and the layer of reinforcement materials, comprising:

at least one lateral radar antenna arranged laterally on the conveyor belt, the at least one lateral radar antenna having an aperture angle and comprising at least one transmission antenna and one reception antenna;

at least one perpendicular radar antenna oriented substantially perpendicular onto the surface of the conveyor belt;

a signal processing unit;

a holding device; and a carrier framework of the belt conveyor attached to the holding device and the at least one lateral radar antenna fixable to the holding device, wherein the holding device is adapted for a vertical adjustment and an angular alignment of the at least one lateral radar antenna, the at least one lateral radar antenna transmitting frequency modulated continuous wave (FMCW radar) radar beams toward the conveyor belt and periodically receiving a reflection of the transmitted radar beams by the side edge of the conveyor belt and by the loading boundary of the bulk material loaded on the conveyor belt, the at least one lateral radar antenna transmitting corresponding signals to the signal processing unit, the at least one perpendicular radar antenna transmitting frequency modulated continuous wave (FMCW radar) radar beams and periodically receiving a reflection of the transmitted radar beams by the surface of the conveyor belt and by the layer of reinforcement materials embedded in the conveyor belt, and the at least one perpendicular radar antenna transmitting corresponding signals to the signal processing unit, the apparatus being configured to provide a reflection curve based on the reflection of the transmitted radar beams, the reflection curve having a first peak showing the radar beams reflected from the side edge of the outermost carrier roller of the belt conveyor, a second peak showing a location of the side edge of the conveyor belt and a third peak showing location of the loading boundary of the bulk material loaded on the conveyor belt.

\* \* \* \* \*